(12) United States Patent
Gangarosa

(10) Patent No.: US 11,363,809 B2
(45) Date of Patent: Jun. 21, 2022

(54) INSECT VACUUM DEVICE

(71) Applicant: Paul Gangarosa, Charleston, SC (US)

(72) Inventor: Paul Gangarosa, Charleston, SC (US)

( * ) Notice: Subject to any disclaimer, the term of this patent is extended or adjusted under 35 U.S.C. 154(b) by 79 days.

(21) Appl. No.: 17/020,677

(22) Filed: Sep. 14, 2020

(65) Prior Publication Data

US 2021/0219536 A1    Jul. 22, 2021

Related U.S. Application Data

(60) Provisional application No. 62/964,201, filed on Jan. 22, 2020.

(51) Int. Cl.
*A01M 3/00*    (2006.01)

(52) U.S. Cl.
CPC ....... *A01M 3/005* (2013.01); *A01M 2200/012* (2013.01)

(58) Field of Classification Search
USPC .................................................. 43/138–139
See application file for complete search history.

(56) References Cited

U.S. PATENT DOCUMENTS

| | | | | |
|---|---|---|---|---|
| 3,965,608 A * | 6/1976 | Schuman | ............. | A01M 3/005 43/110 |
| 4,074,458 A | 2/1978 | Catlett | | |
| 4,175,352 A * | 11/1979 | Catlett | .................... | A01M 1/06 15/342 |
| 4,449,319 A * | 5/1984 | Garcia | .................. | A01M 3/005 43/139 |
| 4,733,495 A * | 3/1988 | Winnicki | ............. | A01M 3/005 43/134 |
| 4,817,330 A * | 4/1989 | Fahringer | ............... | A01M 1/06 43/133 |

(Continued)

FOREIGN PATENT DOCUMENTS

| | | | |
|---|---|---|---|
| CN | 107736333 A | * | 2/2018 |
| CN | 108056080 A | * | 5/2018 |

(Continued)

OTHER PUBLICATIONS

BugZooka WB100 Bug Catcher Vacuum https://www.amazon.com/BugZooka-WB100-Bug-Catcher-Vacuum/dp/B004OHAK5K/ref=sr_1_3?dchild=1&keywords=vacuum+bug+catcher&qid=1590505483&sr=8-3.

(Continued)

*Primary Examiner* — Peter M Poon
*Assistant Examiner* — Morgan T Jordan
(74) *Attorney, Agent, or Firm* — Boudwin Intellectual Property; Daniel Boudwin

(57) ABSTRACT

An insect vacuum device includes a housing having an inlet end opposite a rear end. A grip portion extends from a lower side of the housing. A barrel is affixed to the inlet end, wherein the barrel is in fluid communication with an interior volume of the housing. A reservoir is removably securable to the lower side between the grip portion and the inlet end. A motor is within the housing at the rear end, wherein the motor generates suction between the inlet end and the reservoir when the motor is activated. A trigger is disposed on the lower side, wherein the trigger activates the motor when the trigger is actuated. An inlet valve and a motor valve are disposed within the housing and move to an open position while the trigger is actuated.

20 Claims, 4 Drawing Sheets

(56) References Cited

U.S. PATENT DOCUMENTS

| | | | |
|---|---|---|---|
| 4,918,857 A * | 4/1990 | Wade | A01M 1/06 15/330 |
| 5,116,219 A | 5/1992 | Zimmerman | |
| 5,175,960 A * | 1/1993 | Wade | A01M 1/06 43/134 |
| 5,367,821 A * | 11/1994 | Ott | A01M 1/06 43/134 |
| 5,647,164 A * | 7/1997 | Yates | A01M 1/023 43/132.1 |
| 6,202,343 B1 | 3/2001 | Mah | |
| 6,226,919 B1 | 5/2001 | Septer | |
| 6,564,422 B2 * | 5/2003 | Nakabayashi | A47L 5/00 15/344 |
| 6,640,489 B1 | 11/2003 | Boulton | |
| 6,651,380 B2 * | 11/2003 | Wyers | A01M 1/06 43/139 |
| 8,074,395 B2 * | 12/2011 | Jancic | A01M 3/005 43/139 |
| 8,276,313 B2 * | 10/2012 | Reime | A01M 3/00 43/113 |
| 8,595,894 B1 * | 12/2013 | Kakish | A47L 5/24 15/339 |
| 2003/0051391 A1 * | 3/2003 | Jablin | A01M 1/023 43/139 |
| 2007/0074447 A1 * | 4/2007 | Kalogroulis | A01M 1/106 43/107 |
| 2007/0169403 A1 * | 7/2007 | Collins | A01M 1/06 43/139 |
| 2007/0266678 A1 * | 11/2007 | Makarov | B04C 5/13 55/337 |
| 2011/0232574 A1 * | 9/2011 | Troutman | A01K 13/003 119/6.5 |
| 2012/0036675 A1 * | 2/2012 | Conrad | A47L 9/1625 15/347 |
| 2012/0137569 A1 * | 6/2012 | Younts | A01M 1/026 43/139 |
| 2014/0013655 A1 * | 1/2014 | Southard | A01M 1/22 43/139 |
| 2016/0255824 A1 | 9/2016 | Foster | |

FOREIGN PATENT DOCUMENTS

| | | | |
|---|---|---|---|
| DE | 102009025526 A1 * | 12/2010 | A01M 3/005 |
| DE | 102016124986 A1 * | 6/2018 | A47L 9/28 |
| GB | 2482406 A * | 2/2012 | A01M 3/005 |
| KR | 102238955 B1 * | 4/2021 | |

OTHER PUBLICATIONS

Nature Bound Bug Catcher Toy, Eco-Friendly Bug Vacuum, Catch and Release Indoor/Outdoor Play, Ages 5-12 https://www.amazon.com/Nature-Bound-Catcher-Eco-Friendly-Release/dp/B00UJGU9GK/ref=sr_1_2?dchild=1&keywords=vacuum+bug+catcher&qid=1590505535&sr=8-2.

Angveirt Scorpion Traps Critter Catcher Humane Bug Catcher Bug Grabber Insect Grabber Pick Up Tool 29" Foldable Long Arm Handle as Well as Bug Vacuum, Brown https://www.amazon.com/Angveirt-Scorpion-Critter-Catcher-Foldable/dp/B07Z7ZPXDB/ref=sr_1_5?dchild=1&keywords=vacuum+bug+catcher&qid=1590505535&sr=8-5.

Nature Bound Bug Catcher Vacuum with Light Up Critter Habitat Case for Backyard Exploration—Complete Kit for Kids Includes Vacuum and Cage https://www.amazon.com/Nature-Bound-Catcher-Backyard-Exploration/dp/B00UUS460C/ref=sr_1_7?dchild=1&keywords=vacuum+bug+catcher&qid=1590505535&sr=8-7.

Bell+Howell Monster Trapper 1923 Vacuum-Based Trap for Bugs and Insects, No Zapping Noise, Whisper-Quiet, 100% Chemical-Free, Pest Killer As Seen On TV, 8.5"x7.5" https://www.amazon.com/Emsco-Group-MISHON-Howell-Zapper/dp/B078HCLCJM/ref=sr_1_12?dchild=1&keywords=vacuum+bug+catcher&qid=1590505535&sr=8-12.

Toysmith Bug Vacuum Set https://www.amazon.com/Toysmith-4023-Bug-Vacuum-Set/dp/B00170725S/ref=sr_1_26?dchild=1&keywords=vacuum+bug+catcher&qid=1590505535&sr=8-26.

* cited by examiner

INSECT VACUUM DEVICE

CROSS REFERENCE TO RELATED APPLICATIONS

This application claims the benefit of U.S. Provisional Application No. 62/964,201 filed on Jan. 22, 2020. The above identified patent application is herein incorporated by reference in its entirety to provide continuity of disclosure.

BACKGROUND OF THE INVENTION

The present invention relates to insect removal devices. More particularly, the present invention pertains to an insect vacuum configured to draw insects off of surfaces, or from the air, into a reservoir affixed to the insect vacuum.

Many individuals struggle with removing insects from homes, businesses, or outdoor dining areas. Insects can prove to be a major distraction and irritant, preventing an individual from enjoying themselves. Additionally, many insects such as mosquitoes, wasps, bees, and the like, can pose a danger to individuals who may be allergic to stings or bites. Such individuals often avoid areas where such insects are prevalent, which can result in significant inconvenience.

Typically, in order to combat insects in a desired area, individuals may attempt to stomp, swat, or otherwise kill insects. However, doing so often leaves a mess, and failing to kill the insect may lead to the insect becoming hostile, attacking the individual. Alternatively, individuals may spray chemicals to kill insects or keep insects at bay, however such chemicals may be dangerous to the environment. Additionally, insects typically are prevalent around sources of food, which may preclude the use of chemical sprays to avoid contaminating the food. Therefore, a device that can remove or kill insects while maintaining a safe distance from the insect is desired.

In light of the devices disclosed in the known art, it is submitted that the present invention substantially diverges in design elements from the known art and consequently it is clear that there is a need in the art for an improvement to existing insect removal devices. In this regard, the instant invention substantially fulfills these needs.

SUMMARY OF THE INVENTION

In view of the foregoing disadvantages inherent in the known types of insect removal devices now present in the known art, the present invention provides an insect vacuum device wherein the same can be utilized for providing convenience for the user when removing an insect from a home, office, building, outdoor dining area, or from another desired area.

The present system comprises a housing having an inlet end opposite a rear end. A grip portion extends from a lower side of the housing. A barrel is affixed to the inlet end, wherein the barrel is in fluid communication with an interior volume of the housing. A reservoir is removably securable to the lower side between the grip portion and the inlet end, wherein the reservoir is in fluid communication with the inlet end. A motor is disposed within the housing at the rear end, wherein the motor generates suction between the inlet end and the reservoir when the motor is activated. A trigger is disposed on the lower side of the housing, wherein the trigger activates the motor when the trigger is actuated. A door is movably affixed to the housing at an upper opening of the reservoir, wherein the door is configured to selectively move from a closed position to an open position while the trigger is actuated. When in the closed position, the door forms a seal between the upper opening of the reservoir and the housing, preventing insects within the reservoir from escaping. In some embodiments, a stock is affixed to the rear end of the housing. In such embodiments, the stock may be removably securable to the rear end of the housing.

In another embodiment, the barrel is telescopically movable between an extended position and a retracted position. In other embodiments, a distal end of the barrel tapers outwards defining a funnel. In yet another embodiment, a funnel attachment is removably securable to the distal end of the barrel. In some embodiments, a maximum fill indicium is disposed on an exterior surface of the reservoir. In another embodiment, a cylindrical sidewall extends from a perimeter of the upper opening into an interior of the reservoir. In other embodiments, a baffle extends from an interior surface of the lower side of the housing between the grip portion and the reservoir. In yet another embodiment, an air permeable filter is disposed within the housing between the motor and the reservoir, the filter configured to prevent insects from contacting the motor. In some embodiments, a fan is disposed on an upper side of the housing opposite the reservoir, wherein the fan is configured to force air towards the reservoir.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
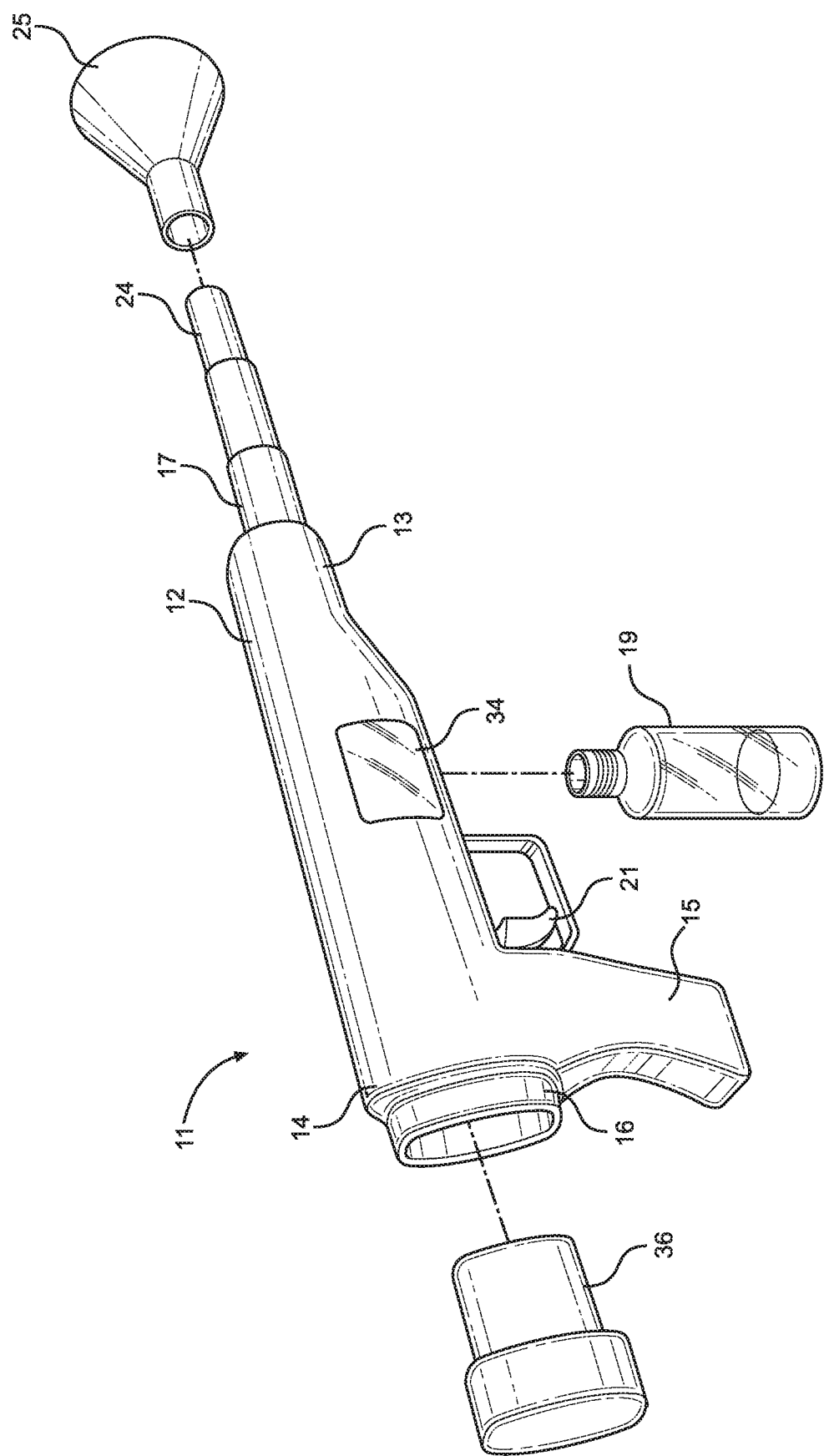
FIG. 1 shows an exploded view of an embodiment of the insect vacuum device.

Reference is made herein to the attached drawings. Like reference numerals are used throughout the drawings to depict like or similar elements of the insect vacuum device. The figures are intended for representative purposes only and should not be considered to be limiting in any respect.

Figure 4:
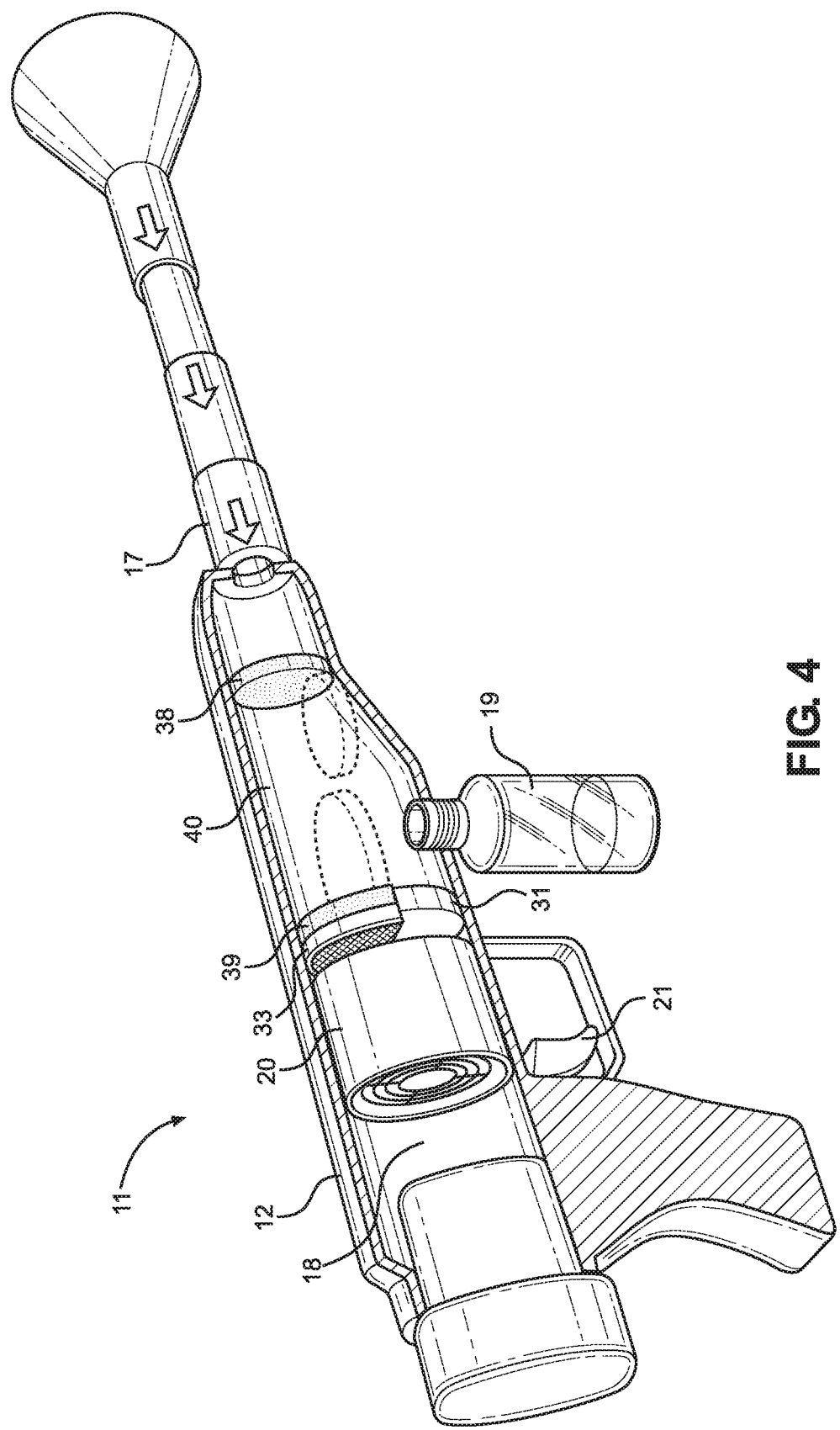
FIG. 4 shows a cross-sectional view of an embodiment of the insect vacuum device.

Referring now to FIG. 1, there is shown an exploded view of an embodiment of the insect vacuum device. The insect vacuum device 11 comprises a housing 12 having an inlet end 13 opposite a rear end 14, defining an interior volume (as shown in FIG. 4, 18) therebetween. In the illustrated embodiment, the housing 12 is substantially rifle shaped, however alternate form factors are contemplated, such as a more compact pistol shaped embodiment. A grip portion 15 extends from a lower side 16 of the housing 12. In some embodiments, the grip portion 15 comprises an ergonomic form factor configured to contour to a user's hand for increased comfort during use. In another embodiment, an exterior surface of the grip portion 15 comprises a textured surface to increase frictional engagement with a user's hand. A trigger 21 is disposed adjacent to the grip portion 15, wherein the trigger is configured to selectively engage a motor (as shown in FIG. 4, 20) to generate a vacuum driving airflow through the inlet end 13 and into the interior volume of the housing 12. In the illustrated embodiment, a stock 36 is removably securable to the rear end 14 of the housing 12, wherein the stock 36 allows a user to stabilize the housing 12 against a shoulder or other surface to assist in aiming the inlet end 13.

In the illustrated embodiment, a window 34 is disposed on a lateral side of the housing 12, wherein the window 34 is transparent and allows a user to view the interior volume of the housing 12. In this manner, the user can determine whether any insects have been captured by the insect vacuum device 11 during operation. A reservoir 19 is removably securable to the lower side 16 of the housing 12, wherein the reservoir 19 is in fluid communication with the interior volume when secured to the housing 12. The reservoir 19 is configured to hold a volume of liquid, such as water, in which insects captured by the insect vacuum device 11 can be contained and disposed from. In some embodiments, the vacuum generated by the motor forces insects trapped within the interior volume to be swept into the reservoir 19. In alternate embodiments, the liquid within the reservoir 19 must be transferred to the interior volume to ensnare insects therein, which are subsequently drained into the reservoir 19. In such embodiments, the user may use the window 34 to ensure that all insects within the interior volume are properly transferred to the reservoir 19.

A barrel 17 is affixed to the inlet end 13 of the housing 12, wherein the barrel 17 is in fluid communication with the interior volume. When the trigger 21 is actuated, air is transferred through the barrel 17 into the interior volume such that any insects in the vicinity of the barrel 17 are drawn into the housing 12. In the shown embodiment, a funnel attachment 25 is removably securable to the barrel 17, wherein the funnel attachment 25 comprises a stem affixed to a funnel portion. The funnel portion tapers radially outwardly from a first end thereof towards a second end thereof, such that the second end comprises a diameter greater than the first end. In the illustrated embodiment, a funnel attachment 25 is removably securable to a distal end 24 of the barrel 17. In the shown embodiment, the stem of the funnel attachment 25 removably secures over the distal end 24 of the barrel 17 via friction fit, however alternate securement means are contemplated, such as complementary threading. The funnel attachment 25 provides an increased surface area, allowing a user to target a larger area. Any insects within the larger area will then be swept into the funnel attachment 25 and guided into the barrel 17. In this manner, precise aim is not required to capture insects flying in the surrounding area.

Figure 2A:
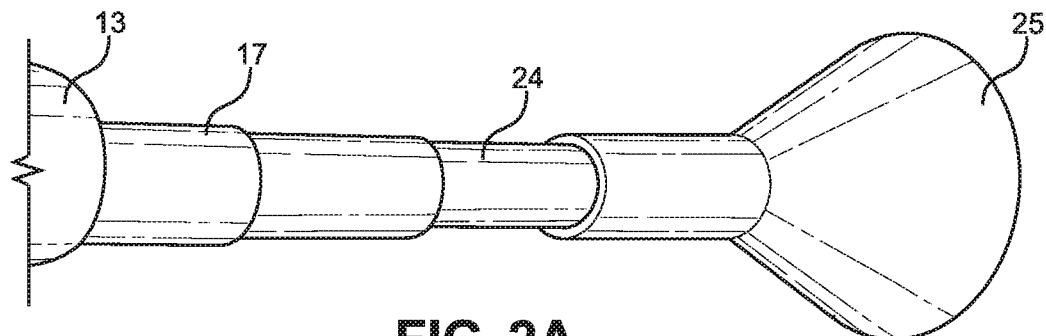
FIG. 2A shows a close-up view of the barrel of an embodiment of the insect vacuum device in an extended position.
Figure 2B:
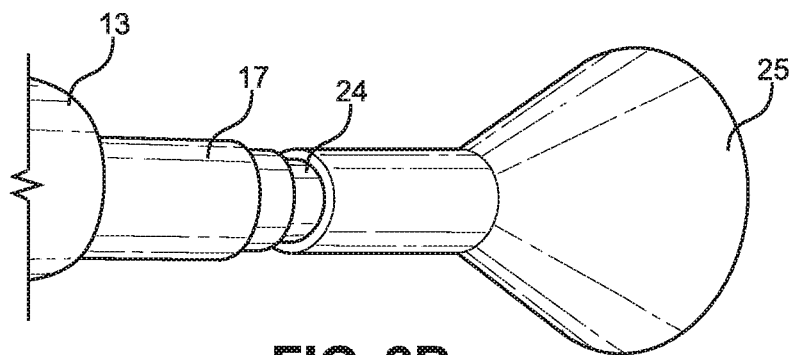
FIG. 2B shows a close-up view of the barrel of an embodiment of the insect vacuum device in a retracted position.

Referring now to FIGS. 2A and 2B, there is shown a close-up view of the barrel of an embodiment of the insect vacuum device in an extended position and a close-up view of the barrel of an embodiment of the insect vacuum device in a retracted position, respectively. In the illustrated embodiments, the barrel 17 comprises a plurality of telescopic sections selectively movable between an extended position (as shown in FIG. 2A) and a retracted position (as shown in FIG. 2B), wherein a linear distance between the inlet end 13 and the distal end 24 of the barrel 17 is greater in the extended position. In this manner, the insect vacuum device can be collapsed to occupy less space to aid in transport and storage. Alternatively, should the user be in a confined space, an extended barrel 17 may prove difficult to operate, such that the retracted position of the telescopic barrel 17 may be more desirable. In some embodiments, the funnel attachment 25 may be permanently affixed to the distal end 24 of the barrel 17. In some embodiments, each of the plurality of telescopic sections may be collapsible within the inlet end 13 of the housing, however, in the shown embodiment, an initial telescopic section is fixed to the inlet end 13, such that the remaining telescopic sections are collapsible within the initial telescopic section.

Figure 3:
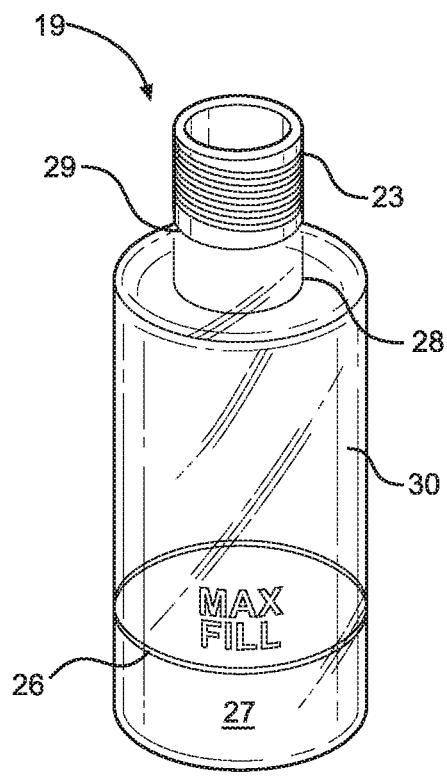
FIG. 3 shows a perspective view a reservoir of an embodiment of the insect vacuum device.

Referring now to FIG. 3, there is shown a perspective view of a reservoir of an embodiment of the insect vacuum device. In the illustrated embodiment, the reservoir 19 comprises a substantially cylindrical container, however alternate forms are contemplated. The reservoir 19 further comprises an upper opening 23 extending from an upper end of the reservoir 19, wherein the upper opening 23 is removably securable within the lower side of the housing. In the illustrated embodiment, the upper opening 23 comprises threading along an exterior thereof, wherein the threading removably secures the upper opening 23 within the housing via complementary threading thereon. The upper opening 23 provides access to an interior 30 of the reservoir 19, such that fluid and insects can be transferred therethrough. In the illustrated embodiment, a cylindrical sidewall 28 extends into the interior 30 from a perimeter 29 of the upper opening 23. The cylindrical sidewall 28 prevents liquid within the interior 30 from entering the housing inadvertently while handling the insect vacuum device, such as when the user tilts the housing upwards to aim. In the shown embodiment, the reservoir 19 further comprises a maximum fill indicium 26 disposed on an exterior surface 27 thereof, wherein the maximum fill indicium 26 indicates the desired maximum volume of liquid to be stored within the reservoir 19. The height of the maximum fill indicium 26 along the reservoir 19 can be calibrated relative to the width and length of the cylindrical sidewall 28, such that when the reservoir 19 is horizontal, the liquid within the reservoir 19 does not exceed the distance between a wall of the reservoir 19 and the cylindrical sidewall 28. In this manner, this ensures that liquid within the reservoir 19 does not inadvertently enter the housing during operation, thereby minimizing the risk of damage to the motor and other electronic components therein.

Referring now to FIG. 4, there is shown a cross-sectional view of an embodiment of the insect vacuum device. An inlet valve 38 is disposed at the inlet end of the housing 12 and a rear valve 39 is disposed anterior to the reservoir 19, wherein the inlet valve 38 and the rear valve 39 define a forward chamber 40 therebetween. The inlet valve 38 and the rear valve 39 are configured to selectively move from a closed position to an open position when the trigger 21 is actuated. In this manner, the motor 20 is activated upon trigger 21 actuation, and the valves 38, 39 open to allow air to flow through the barrel 17 into the interior volume 18 of the housing 12. In some embodiments, ventilation apertures are disposed on the housing 12, wherein the ventilation apertures are configured to provide an exit for exhaust from the motor 20 during operation. In other embodiments, the stock may be removed from the rear end to provide an opening through which the motor 20 can ventilate exhaust. Upon release of the trigger 21, the valves 38, 39 move to the closed position, such that any insects drawn into the housing 12 are contained within the forward chamber 40 or reservoir 19. In some embodiments, the user must upend the housing 12 to fill the forward chamber 40 with the liquid contained within the reservoir 19. Once the liquid has been transferred, the liquid and entrapped insects can then be drained back into the reservoir 19. In such embodiments, the inlet valve 38 and the rear valve 39 form a watertight seal when in the closed position to prevent the liquid coming into contact with the motor and any other electronic components within the housing 12.

In the illustrated embodiment, a baffle 31 extends from the lower side of the housing 12 into the interior volume 18. The baffle 31 comprises a solid impermeable extension, wherein the baffle 31 is configured to prevent liquid transferred from the reservoir 19 from contacting the motor 20. The baffle 31 may be present in embodiments lacking the cylindrical sidewall of the reservoir 19, such that tilting the insect vacuum device during use does not cause liquid to pass beyond the forward chamber 40 into the motor 20. Similarly, both the baffle 31 and cylindrical sidewall can be present to provide an additional layer of security. In embodiments lacking the baffle 31, the rear valve 39 extends across an entirety of the interior volume 38. A filter 33 is disposed between the rear valve 39 and the motor 20, wherein the filter 33 is configured to allow air to pass therethrough, while preventing solid objects, such as insects from passing therethrough. In this manner, the filter 33 is configured to prevent insects or other debris captured by the airflow from contacting the motor 20. In the shown embodiment, the filter 33 is disposed above the baffle 31 and is dimensioned to match the rear valve 39, however, in alternate embodiments, the filter 33 extends between an upper side and the lower side of the housing 12, such that the filter 33 extends across a plane perpendicular to the interior volume 18.

Figure 5:
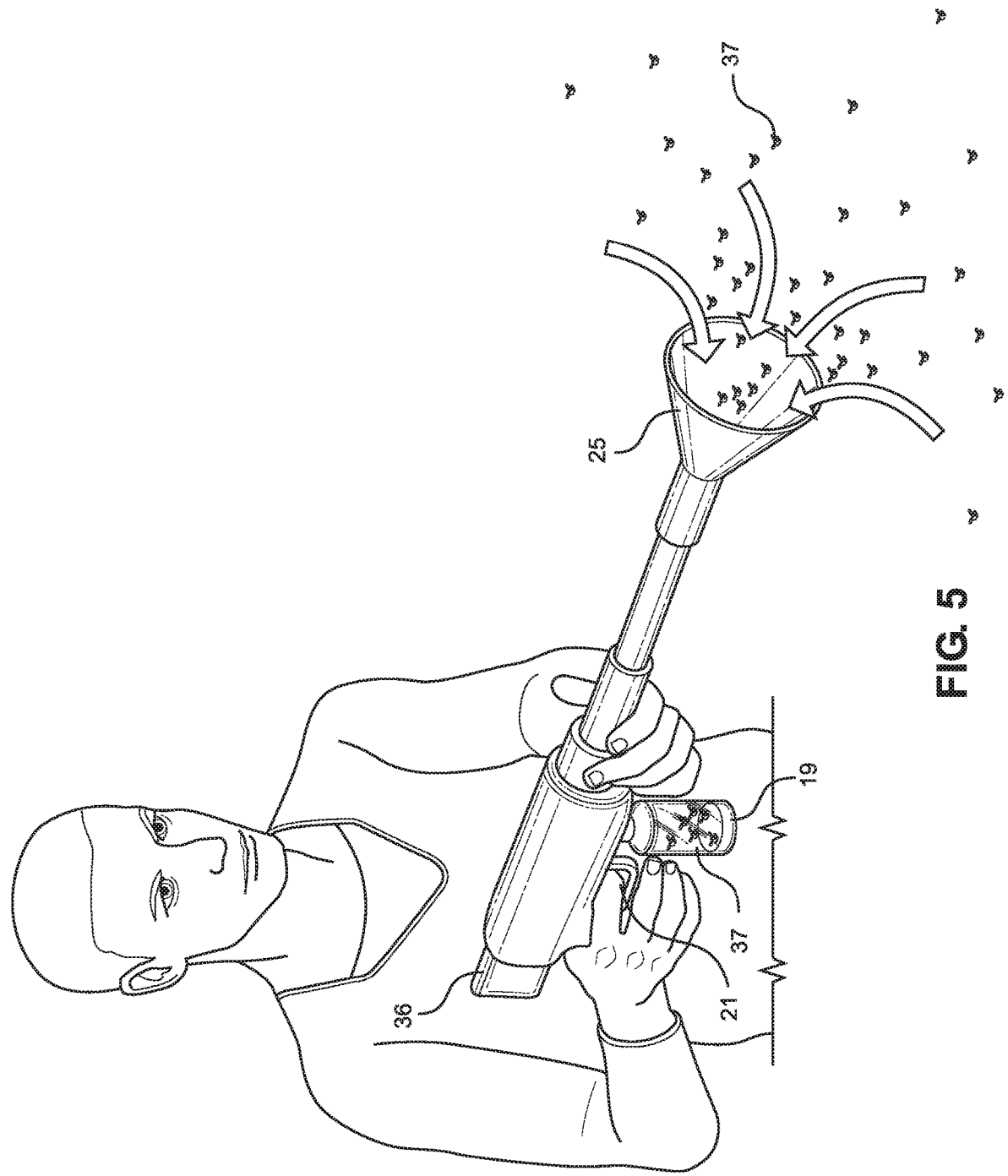
FIG. 5 shows a perspective view of an embodiment of the insect vacuum device in use.

Referring now to FIG. 5, there is shown a perspective view of an embodiment of the insect vacuum device in use. In one use, the user grasps the grip portion and aims the housing at a desired area containing one or more insects 37. In embodiments wherein the housing includes a stock 36, the user can stabilize the housing against a shoulder or other surface to increase accuracy. Once the user actuates the trigger 21, the motor activates generating a vacuum to cause air to be drawn through the barrel via the funnel attachment 25. Any insects 37 caught in the airflow will then be transferred into the interior volume of the housing and the reservoir 19. Once the trigger 21 is released, in order to ensure that all captured insects are disposed of, the user can upend the housing to drain the liquid from the reservoir 19 into the interior volume. The user can then shake the device to entrap the insects 37 within the liquid, thereby capturing or drowning them, before righting the device to drain the liquid and insects 37 back into the reservoir 19. In embodiments having the window shown in FIG. 1, the user can view the interior volume to ensure all insects 37 have been transferred into the reservoir 19. The user can then detach the reservoir 19 from the housing to dispose of the liquid and insects 37 as desired to ready the reservoir 19 for reuse.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An insect vacuum device, comprising:
a housing having an inlet end opposite a rear end;
a grip portion extending from a lower side of the housing;
a barrel affixed to the inlet end, wherein the barrel is in fluid communication with an interior volume of the housing;
a reservoir removably securable to the lower side between the grip portion and the inlet end;
a liquid disposed within an interior of the reservoir;
wherein the reservoir is in fluid communication with the inlet end;
a motor disposed within the housing at the rear end, wherein the motor generates suction between the inlet end and the reservoir when the motor is activated;
a trigger disposed on the lower side of the housing;
wherein the trigger activates the motor when the trigger is actuated;
an inlet valve disposed within the inlet end of the housing;
a motor valve disposed within the housing between the motor and the reservoir;
wherein the inlet valve and the motor valve define a forward chamber therebetween;
wherein the inlet valve and the motor valve are configured to selectively move from a closed position to an open position while the trigger is actuated;
wherein in the closed position, the inlet valve and the motor valve form a watertight seal about the forward chamber, such that upon inversion of the housing, the liquid enters and is retained within the forward chamber.

2. The insect vacuum device of claim 1, wherein the barrel is telescopically movable between an extended position and a retracted position.

3. The insect vacuum device of claim 1, wherein a distal end of the barrel tapers outwards defining a funnel.

4. The insect vacuum device of claim 1, further comprising a funnel attachment removably securable to a distal end of the barrel.

5. The insect vacuum device of claim 1, wherein the reservoir further comprises a maximum fill indicium on an exterior surface thereof.

6. The insect vacuum device of claim 1, further comprising a cylindrical sidewall extending from a lower surface of an upper wall of the reservoir about a perimeter of the upper opening, such that the cylindrical sidewalls extends into an interior of the reservoir.

7. The insect vacuum device of claim 6, wherein a length of the cylindrical sidewall is calibrated relative to a volume of the liquid corresponding to a maximum fill indicium disposed on the reservoir, such that when the reservoir is disposed horizontally, the liquid does not extend beyond the cylindrical sidewall.

8. The insect vacuum device of claim 1, further comprising a baffle extending from an interior surface of the lower side of the housing between the grip portion and the reservoir.

9. The insect vacuum device of claim 1, further comprising an air permeable filter within the housing between the motor and the motor valve, the filter configured to prevent insects from contacting the motor.

10. The insect vacuum device of claim 1, further comprising a window disposed on a sidewall of the housing, wherein the window provides a view into the forward chamber.

11. An insect vacuum device, comprising:
a housing having an inlet end opposite a rear end;
a stock affixed to the rear end of the housing;
a grip portion extending from a lower side of the housing;
a barrel affixed to the inlet end, wherein the barrel is in fluid communication with an interior volume of the housing;
a reservoir removably securable to the lower side between the grip portion and the inlet end;
a liquid disposed within an interior of the reservoir;
wherein the reservoir is in fluid communication with the inlet end;
a motor disposed within the housing at the rear end, wherein the motor generates suction between the inlet end and the reservoir when the motor is activated;
a trigger disposed on the lower side of the housing;
wherein the trigger activates the motor when the trigger is actuated;
an inlet valve disposed within the inlet end of the housing;
a motor valve disposed within the housing between the motor and the reservoir;
wherein the inlet valve and the motor valve define a forward chamber therebetween;
wherein the inlet valve and the motor valve are configured to selectively move from a closed position to an open position while the trigger is actuated;
wherein in the closed position, the inlet valve and the motor valve form a watertight seal about the forward chamber, such that upon inversion of the housing, the liquid enters and is retained within the forward chamber.

12. The insect vacuum device of claim 11, wherein the barrel is telescopically movable between an extended position and a retracted position.

13. The insect vacuum device of claim 11, wherein a distal end of the barrel tapers outwards defining a funnel.

14. The insect vacuum device of claim 11, further comprising a funnel attachment removably securable to a distal end of the barrel.

15. The insect vacuum device of claim 11, wherein the reservoir further comprises a maximum fill indicium on an exterior surface thereof.

16. The insect vacuum device of claim 11, further comprising a cylindrical sidewall extending from a lower surface of an upper wall of the reservoir about a perimeter of the upper opening, such that the cylindrical sidewalls extends into an interior of the reservoir.

17. The insect vacuum device of claim 11, further comprising a baffle extending from an interior surface of the lower side of the housing between the grip portion and the reservoir.

18. The insect vacuum device of claim 11, further comprising an air permeable filter within the housing between the motor and the motor valve, the filter configured to prevent insects from contacting the motor.

19. The insect vacuum device of claim 11, further comprising a window disposed on a sidewall of the housing, wherein the window provides a view into the forward chamber.

20. The insect vacuum device of claim 11, wherein the stock is removably securable to the rear end.

* * * * *